US011661739B2

(12) United States Patent
Ducharme et al.

(10) Patent No.: US 11,661,739 B2
(45) Date of Patent: May 30, 2023

(54) VIBRATION ABSORPTION DEVICE AND METHOD FOR ACOUSTIC INSULATION

(71) Applicants: Alexandre C. Ducharme, Ste-Anne-des-Plaines (CA); Patrick Wellington, Montréal (CA)

(72) Inventors: Alexandre C. Ducharme, Ste-Anne-des-Plaines (CA); Patrick Wellington, Montréal (CA)

(73) Assignee: DÉVELOPPEMENT R & D, Montreal (CA)

( * ) Notice: Subject to any disclaimer, the term of this patent is extended or adjusted under 35 U.S.C. 154(b) by 0 days.

(21) Appl. No.: 16/159,344

(22) Filed: Oct. 12, 2018

(65) Prior Publication Data

US 2019/0112807 A1    Apr. 18, 2019

(51) Int. Cl.
  *E04B 9/00* (2006.01)
  *E04B 1/98* (2006.01)
  *E04B 1/82* (2006.01)
  *E04F 15/22* (2006.01)

(52) U.S. Cl.
  CPC ............... *E04B 9/001* (2013.01); *E04B 1/98* (2013.01); *E04F 15/225* (2013.01); *E04B 2001/8254* (2013.01)

(58) Field of Classification Search
  CPC .. E04B 9/0001; E04B 1/98; E04B 2001/8254; E04F 15/225
  See application file for complete search history.

(56) References Cited

U.S. PATENT DOCUMENTS

| 1,417,552 A | * | 5/1922 | Muench | ................. E04F 13/04 52/443 |
| 2,738,297 A | * | 3/1956 | Pfistershammer | .... E06B 3/7015 428/117 |

(Continued)

FOREIGN PATENT DOCUMENTS

DE    102009020720 A1 * 11/2010
DE    102013010091 A1 * 12/2014

(Continued)

OTHER PUBLICATIONS

Derwent Abstract for DE 202010009100 U1 (Year: 2010).*

*Primary Examiner* — Brian D Mattei
*Assistant Examiner* — Charissa Ahmad
(74) *Attorney, Agent, or Firm* — PRAXIS

(57) ABSTRACT

A vibration absorption device for acoustic insulation for a building structure comprises an absorbent cushion and a vibration isolation cushion. The building structure is selected from a ceiling structure, a floor structure and a partitioning structure separating two adjacent building compartments or a building compartment and the external environment. The absorbent cushion comprises sound absorbing material and the vibration isolation cushion comprising vibration isolation material. The vibration isolation cushion overlies and is laminated to the absorbent cushion. The vibration isolation cushion is rigid relative to the absorbent cushion. The absorbent cushion is supple relative to the vibration isolation cushion. The vibration absorption device is mountable to the building structure, to isolate vibrations and to provide acoustic insulation between the two separated and adjacent building compartments.

13 Claims, 13 Drawing Sheets

(56) References Cited

U.S. PATENT DOCUMENTS

| | | | | |
|---|---|---|---|---|
| 2,768,091 A * | 10/1956 | Cubberley | ........... | C08L 21/02 |
| | | | | 427/288 |
| 2,840,179 A | 6/1958 | Junger | | |
| 2,854,565 A * | 9/1958 | Kruger | ........... | E04B 9/32 |
| | | | | 52/579 |
| 2,862,255 A * | 12/1958 | Nelson | ........... | E04F 15/225 |
| | | | | 52/403.1 |
| 2,940,887 A * | 6/1960 | McClure | ........... | B29D 99/0057 |
| | | | | 428/165 |
| 2,984,312 A * | 5/1961 | Gambill | ........... | B29C 59/02 |
| | | | | 181/292 |
| 3,077,945 A * | 2/1963 | Thomas | ........... | D21J 1/00 |
| | | | | 181/284 |
| 3,078,971 A * | 2/1963 | Wallerstein, Jr. | ........... | E04B 1/98 |
| | | | | 52/403.1 |
| 3,086,878 A * | 4/1963 | Lauring | ........... | D21J 1/08 |
| | | | | 427/271 |
| 3,160,549 A * | 12/1964 | Caldwell | ........... | B32B 27/00 |
| | | | | 428/317.3 |
| 3,265,154 A * | 8/1966 | March | ........... | E04B 1/86 |
| | | | | 181/290 |
| 3,269,484 A * | 8/1966 | Lighter | ........... | E01F 8/0076 |
| | | | | 181/290 |
| 3,311,331 A * | 3/1967 | Steimen | ........... | D03D 49/025 |
| | | | | 248/633 |
| 3,885,362 A * | 5/1975 | Pollock | ........... | E04B 1/8218 |
| | | | | 52/126.7 |
| 3,968,274 A * | 7/1976 | Harris | ........... | E04C 2/32 |
| | | | | 427/203 |
| 4,002,315 A * | 1/1977 | Van Goubergen | ........... | F16F 1/376 |
| | | | | 248/633 |
| 4,313,524 A * | 2/1982 | Rose | ........... | E04B 1/84 |
| | | | | 181/291 |
| 4,317,503 A * | 3/1982 | Soderquist | ........... | E04B 1/86 |
| | | | | 181/290 |
| 4,425,980 A * | 1/1984 | Miles | ........... | B64C 1/40 |
| | | | | 181/208 |
| 4,720,043 A * | 1/1988 | Ortwein | ........... | E01B 1/001 |
| | | | | 238/2 |
| 4,786,543 A * | 11/1988 | Ferm | ........... | B32B 5/18 |
| | | | | 428/138 |
| 4,838,380 A * | 6/1989 | Lassiter | ........... | E04B 1/8409 |
| | | | | 181/286 |
| 5,259,157 A * | 11/1993 | Ault | ........... | E01F 8/007 |
| | | | | 52/145 |
| 6,244,378 B1 * | 6/2001 | McGrath | ........... | E04B 1/86 |
| | | | | 181/288 |
| 6,601,673 B2 * | 8/2003 | Murakami | ........... | F02B 77/13 |
| | | | | 181/204 |
| 6,983,821 B2 * | 1/2006 | Putt | ........... | B28C 5/381 |
| | | | | 181/288 |
| 7,182,172 B2 * | 2/2007 | Albin, Jr. | ........... | B32B 3/30 |
| | | | | 181/290 |
| 7,837,147 B2 * | 11/2010 | Liguore | ........... | B29C 70/088 |
| | | | | 244/119 |
| 7,921,966 B2 * | 4/2011 | Chiou | ........... | G10K 11/168 |
| | | | | 181/214 |
| 8,113,495 B2 * | 2/2012 | Downey | ........... | F16F 1/37 |
| | | | | 248/633 |
| 8,381,872 B2 * | 2/2013 | Alexander | ........... | E04B 1/8409 |
| | | | | 181/296 |
| 9,803,358 B2 * | 10/2017 | Edmonds | ........... | E04F 15/107 |
| 2003/0102184 A1 * | 6/2003 | Brisson | ........... | B32B 25/10 |
| | | | | 181/290 |
| 2004/0140151 A1 * | 7/2004 | Gallant | ........... | B32B 5/18 |
| | | | | 181/290 |
| 2004/0216423 A1 * | 11/2004 | Pieters | ........... | E04B 2/7412 |
| | | | | 52/782.1 |
| 2008/0020176 A1 * | 1/2008 | Ayle | ........... | F02C 7/045 |
| | | | | 428/118 |
| 2010/0330316 A1 * | 12/2010 | Cao | ........... | F16L 59/141 |
| | | | | 428/36.5 |
| 2016/0153187 A1 * | 6/2016 | Desai | ........... | E04B 1/8409 |
| | | | | 428/497 |
| 2017/0061948 A1 * | 3/2017 | Guzman | ........... | G10K 11/168 |
| 2018/0044925 A1 * | 2/2018 | Koh | ........... | E04F 15/225 |

FOREIGN PATENT DOCUMENTS

| | | | | |
|---|---|---|---|---|
| EP | 1916358 A2 * | 4/2008 | | |
| EP | 2551422 | 1/2013 | | |
| GB | 2356205 A * | 5/2001 | | |
| JP | 2972186 B1 * | 11/1999 | | |
| JP | 2014218893 | 11/2014 | | |
| WO | WO-9823824 A1 * | 6/1998 | ........... | E04B 5/12 |
| WO | WO 2006056351 A1 * | 6/2006 | | |
| WO | WO-2011111608 A1 * | 9/2011 | ........... | E04F 15/20 |

\* cited by examiner

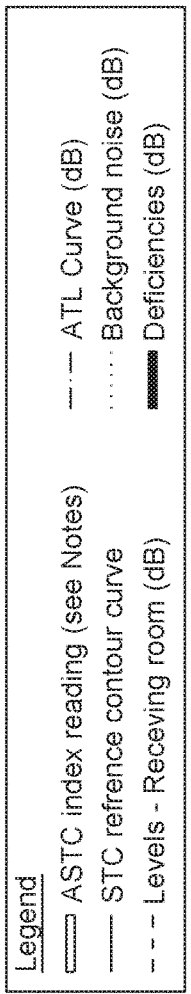

FIG. 12B

From Fig. 12A

| Sum of deficiencies | 12 dB |
|---|---|
| Floor area | 31.0 m² |
| Source room volume | 136.0 m³ |
| Receiving room volume | 74.0 m³ |

Floor/Cieling Assembly 615/515:

No floor covering
4" concrete slab
TMS joists
Double metal channel "U barr" type
6" batt insulation
Gypsum type C Legend
―― ASTC index reading (see Notes)   ――― ATL Curve (dB)
――― STC refrence contour curve      ······ Background noise (dB)
- - - Levels - Receiving room (dB)   ▓▓▓ Deficiencies (dB)

Remarks (dB = decibel, Hz = Hertz):

➢ The bleu curve corresponds to the Apparent Transmission Loss levels ATL(db). They are calculated in accordance with the ASTM E413 standard.
To determine the ASTC index:
Follow the orange dotted line on the frequency axis at 500Hz and read the corresponding value on the ATL axis (dB), which is equivalent to the ASTC index of 55.

➢ The pink curve corresponds to Sound Pressure levels (dB) in the receiving room.

➢ The green line corresponds to the Background Noise levels in the receiving room (dB) (an asterisk is noted on the ATL levels on which a background noise correction was applied).

The measurements procedure of the airborne noise attenuation was conducted according to the ASTM E336 standard.

To Fig. 13B

From Fig. 13A

| | |
|---|---|
| Sum of deficiencies | 22 dB |
| Floor area | 26.0 m² |
| Source room volume | 63.0 m³ |
| Receiving room volume | 63.0 m³ |

Floor/Cieling Assembly 6095/509:

No floor covering
4" concrete slab
TMS joists
Double metal channel "U barr" type
6" batt insulation
PAD system
Gypsum type C Legend
— ASTC index reading (see Notes) — — ATL Curve (dB)
— STC refrence contour curve ⋯⋯ Background noise (dB)
- - - Levels - Receiving room (dB) ▬▬ Deficiencies (dB)

Remarks (dB = decibel, Hz = Hertz):

» The bleu curve corresponds to the Apparent Transmission Loss levels ATL(db). They are calculated in accordance with the ASTM E413 standard. To determine the ASTC index:
Follow the orange dotted line on the frequency axis at 500Hz and read the corresponding value on the ATL axis (dB), which is equivalent to the ASTC index of 60.

» The pink curve corresponds to Sound Pressure levels (dB) in the receiving room.

» The green line corresponds to the Background Noise levels in the receiving room (dB) (an asterisk is noted on the ATL levels on which a background noise correction was applied).

The measurements procedure of the airborne noise attenuation was conducted according to the ASTM E336 standard.

FIG. 13B

From Fig. 14A

| Sum of deficiencies | 23 dB |
|---|---|
| Receiving room volume | 136.7 m³ |

Floor/Cieling Assembly :

3" concrete slab on metal decking
Steel joists +/- 16'
Blowing fibreglass insulation
Metal furrings "U barr" type
(pinned to joists)
5/8" Gypsum type X Legend

| ▬▬▬ AIIC index reading (see Notes) | ─── ANISPL Curve (dB) |
| ─── IIC refrence contour curve | ······ Background noise (dB) |
| ─ ─ ─ Levels - Receving room (dB) | ▬▬▬ Deficiencies (dB) |

Remarks (dB = decibel, Hz = Hertz):

» The bleu curve corresponds to the Apparent Impact Noise levels ANISPL(db). They are calculated in accordance with the ASTM E989 standard.
To determine the AIIC index:
Follow the orange dotted line on the frequency axis at 500Hz and read the corresponding value on the ANISPL axis (dB), then subtract this value from 110. So, 110-62 is equivalent to the AIIC index of 48.

» The pink curve corresponds to Sound Pressure levels (dB) in the receiving room.

» The green line corresponds to the Background Noise levels in the receiving room (dB) (an asterisk is noted on the ANISPL levels on which a background noise correction was applied).

The measurements procedure of the Impact Sound Transmission was conducted using a Tapping Machine according to the ASTM E1007 standard. The bleu curve corresponds to the Apparent Transmission Loss levels ATL (dB). They are calculated in accordance with the ASTM E413 standard.

FIG. 14B

From Fig. 15A

| Sum of deficiencies | 24 dB |
|---|---|
| Receiving room volume | 136.7 m³ |

Legend
—— AIIC index reading (see Notes)     --- ANISPL Curve (dB)
—— IIC refrence contour curve           ······ Background noise (dB)
- - - Levels - Receiving room (dB)      ▓▓▓ Deficiencies (dB)

Remarks (dB = decibel, Hz = Hertz):

» The bleu curve corresponds to the Apparent Impact Noise levels ANISPL(db). They are calculated in accordance with the ASTM E989 standard.
To determine the AIIC index:
Follow the orange dotted line on the frequency axis at 500Hz and read the corresponding value on the ANISPL axis (dB), then subtract this value from 110. So, 110-59 is equivalent to the AIIC index of 51.

» The pink curve corresponds to Sound Pressure levels (dB) in the receiving room.

» The green line corresponds to the Background Noise levels in the receiving room (dB) (an asterisk is noted on the ANISPL levels on which a background noise correction was applied).

The measurements procedure of the Impact Sound Transmission was conducted using a Tapping Machine according to the ASTM E1007 standard. The bleu curve corresponds to the Apparent Transmission Loss levels ATL (dB). They are calculated in accordance with the ASTM E413 standard.

Floor/Cieling Assembly :

3" concrete slab on metal decking
Steel joists +/- 16'
Blowing fibreglass insulation
Metal furrings "U barr" type (pinned to joists)
P.A.D. system acoustic damper anti-vibration (positionned between joists and metal furrings)
"U barr" type pinned to the furrings)
5/8" Gypsum type X

FIG. 15B

VIBRATION ABSORPTION DEVICE AND METHOD FOR ACOUSTIC INSULATION

CROSS-REFERENCE TO RELATED APPLICATIONS

The present application claims priority on Canadian Patent Application No. 2,982,731 filed on Oct. 17, 2017 and issued to patent under Canadian Patent No. 2,982,731 on Jul. 17, 2018 and which is incorporated by reference herein in its entirety.

TECHNICAL FIELD

The present disclosure relates to anti-vibration and insulation for framework floor, partition, and/or ceiling anchoring systems made of concrete, wood and/or metal (steel) for a variety of commercial and non-commercial uses. More particularly, but not exclusively, the present disclosure relates to a vibration absorption device and method for acoustic insulation.

BACKGROUND

Vibration isolation is the process of isolating an object or fixture from the source of vibrations. Vibration is undesirable in many domains Passive vibration isolation refers to vibration isolation or mitigation of vibrations by passive techniques such as rubber pads or mechanical springs, as opposed to active vibration isolation or electronic force cancellation employing electric power, sensors, actuators, and control systems. Soundproofing, also known as acoustic insulation, any means of reducing the intensity of sound.

OBJECTS

An object of the present disclosure is to provide a vibration absorption device for acoustic insulation.

An object of the present disclosure is to provide a vibration absorption assembly for acoustic insulation.

An object of the present disclosure is to provide a vibration absorption kit for acoustic insulation.

An object of the present disclosure is to provide a building structure comprising the vibration absorption devices, assemblies and/or kits for acoustic insulation.

An object of the present disclosure is to provide a method for vibration isolation and acoustic insulation.

SUMMARY

In accordance with an aspect of the disclosure there is provided a vibration absorption device for acoustic insulation for a building structure separating two adjacent building compartments or a building compartment and the external environment, the building structure being selected from the group consisting of a ceiling structure, a floor structure and a partitioning structure, the device comprising: an absorbent cushion comprising sound absorbing material; a vibration isolation cushion comprising vibration isolation material, the vibration isolation cushion overlying and being laminated to the absorbent cushion, the vibration isolation cushion being rigid relative to the absorbent cushion and absorbent cushion being supple relative to the vibration isolation cushion, wherein the vibration absorption device is mountable to the building structure to isolate vibrations and provide acoustic insulation between the two separated and adjacent building compartments.

In an embodiment, the absorbent cushion and the vibration isolation cushion comprise respective exposed surfaces. In an embodiment, at least one of the exposed surfaces is directly mounted to the building structure. In an embodiment, the exposed surface comprises an adhesive substance. In an embodiment, the device further comprises a detachable protective film covering the exposed surface comprising the adhesive substance.

In an embodiment, the device is mountable to a building structure by a mounting element.

In an embodiment, the sound absorbing material comprises rubber. In an embodiment, the rubber comprises neoprene.

In an embodiment, the sound absorbing material comprises a foam.

In an embodiment, the vibration isolation material is selected from the group consisting of a fire rated fireboard panel, cellulose fibers, heat/fire treated cellulose fibers, cellulose fibers mixed with rubber, wood fiber panels, composite panels, gypsum, tissues and any combination thereof.

In an embodiment, the vibration isolation cushion defines an exposed surface comprising dimples for providing air pockets for additional absorption.

In an embodiment, the thickness of the absorbent cushion is greater than the thickness of the vibration isolation cushion. In an embodiment, the absorbent cushion comprises about 75% of the total thickness of the device.

In an embodiment, the device further comprises connecting elements for connecting the device to another vibration absorption device for acoustic insulation.

In an embodiment, the device comprises a rectangular pad.

In accordance with an aspect of the disclosure there is provided a vibration absorption assembly for acoustic insulation for a building structure separating two adjacent building compartments or a building compartment and the external environment, the building structure being selected from the group consisting of a ceiling structure, a floor structure and a partitioning structure, the assembly comprising: a plurality of the vibration absorption device for acoustic insulation provided herein.

In an embodiment, each of the devices comprises connecting elements for mutually connecting two adjacently positioned devices together.

In an embodiment, the devices are mounted to a sheet, the sheet being mountable to the building structure. In an embodiment, the sheet comprises an adhesive substance. In an embodiment, the adhesive substance is covered by a detachable protective film.

In accordance with an aspect of the disclosure there is provided a vibration absorption kit for acoustic insulation for a building structure separating two adjacent building compartments or a building compartment and the external environment, the building structure being selected from the group consisting of a ceiling structure, a floor structure and a partitioning structure, the kit comprising: vibration absorption assembly for acoustic insulation provided herein; and at least one structural element for building the building structure.

In accordance with an aspect of the disclosure there is provided a ceiling comprising: an overhead structure; and at least one beam mounted to the overhead structure at one end thereof and defining at least one anchoring point at the other end thereof for being anchored to another structural element; the vibration absorption device for acoustic insulation, mounted the anchoring point of the beam.

In accordance with an aspect of the disclosure there is provided a method for vibration isolation and acoustic insulation of building structure separating two adjacent building compartments or a building compartment and the external environment, the building structure being selected from the group consisting of a ceiling structure, a floor structure and a partitioning structure, the method comprising: providing a plurality of the vibration absorption devices for acoustic insulation; and mounting the plurality of the devices to the building structure.

The present disclosure provides an assembly of two different materials, one material absorbs low frequencies (i.e. a sponge like material with perforations) while the second material is fibrous and acts as an absorbent for medium frequencies. Low and medium frequencies are well understood in the art.

In an embodiment, there are no mechanical attachments required with peal and stick application of the device on a surface area as will be further explained herein.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIGS. 12A and 12B are a graphical representation of an absorption and insulation test (TEST A-1) performed on a floor/ceiling assembly without the use of an assembly of vibration absorption devices;

FIGS. 13A and 13B are a graphical representation of an absorption and insulation test (TEST A-2) performed the same floor/ceiling assembly as used in TEST A-1 but with the use of an assembly of vibration absorption devices;

FIGS. 14A and 14B are a graphical representation of an absorption and insulation test (TEST B-1) performed on a floor/ceiling assembly without the use of an assembly of vibration absorption devices;

FIGS. 15A and 15B are a graphical representation of an absorption and insulation test (TEST B-2) performed the same floor/ceiling assembly as used in TEST B-2 but with the use of a kit including an assembly of vibration absorption devices.

DETAILED DESCRIPTION

Generally stated, there is provided by the present disclosure and in accordance with non-limiting exemplary embodiments thereof, a vibration absorption device for acoustic insulation for a building structure separating two adjacent building compartments or a building compartment and the external environment. The building structure being selected from the group consisting of a ceiling structure, a floor structure and a partitioning structure. The device comprising an absorbent cushion comprising sound absorbing material and a vibration isolation cushion comprising vibration isolation material. The vibration isolation cushion overlying and being laminated to the absorbent cushion. The vibration isolation cushion being rigid relative to the absorbent cushion. The absorbent cushion being supple relative to the vibration isolation cushion. The vibration absorption device is mountable to the building structure, to isolate vibrations and provide acoustic insulation between the two separated and adjacent building compartments.

Figure 1:
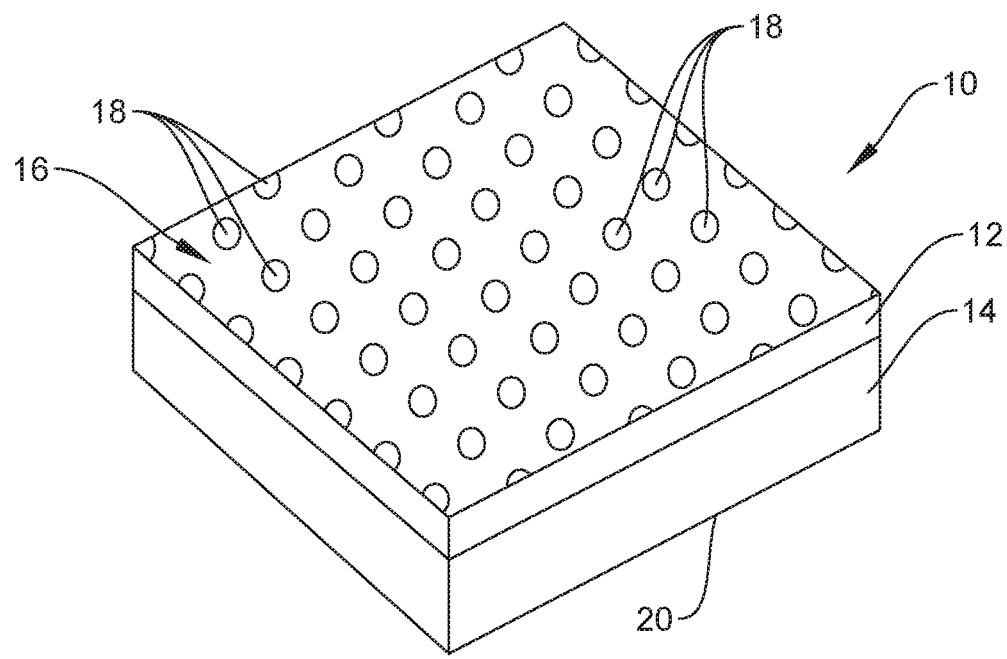
FIG. 1 is a first surface and side perspective view of the vibration absorption device in accordance with a non-limiting illustrative embodiment of the present disclosure.
Figure 2:
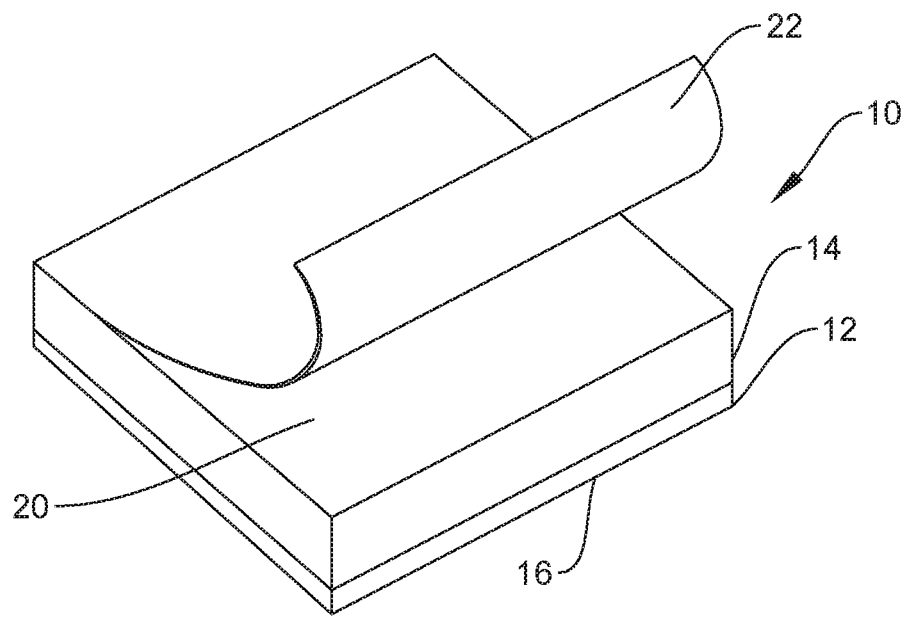
FIG. 2 is a second surface and side perspective view of the vibration absorption device of FIG. 1.

FIGS. 1 and 2 show a vibration absorption device 10 for acoustic insulation. The device 10 is a composite absorption element that comprises an anti-vibration or vibration isolation cushion 12 overlying an absorbent cushion 14. In an embodiment, cushion 12 is a fire rated fiberboard panel laminated to the absorbent cushion 14 which is an absorbent foam and then the composite material is cut into suitable pieces thus providing the devices 10 having various shape, sizes and configurations as will be further discussed. The anti-vibration cushion 12 is a rigid body whereas the absorbent cushion 14 is a supple body. Cushions 12 and 14 work together synergistically to provide vibration and acoustic isolation.

In an embodiment, the anti-vibration cushion 12 and the absorbent cushion 14 have the same thickness. In an embodiment, the thickness of the absorbent cushion 14 is greater than the thickness of the anti-vibration cushion 12. In an embodiment, the absorbent cushion 14 has a thickness that is 2 to 4 times greater than the thickness of the anti-vibration cushion 12. In an embodiment, the anti-vibration cushion 12 is about 25% of the total thickness of the device 10, whereas the absorption cushion 14 is about 75% of the total thickness of the device 10.

In an embodiment, the anti-vibration cushion 12 has a material density of about 0.01 lb/ft$^3$ to about 10 lb/ft$^3$. In an embodiment, the absorbent cushion 14 has material density of about 5 lb/ft$^3$ to about 185 lb/ft$^3$.

In one non-limiting example, the device 10 is in the form of a rectangular pad. In one non-limiting example, the pad 10 has a thickness T of about ½ an inch, a width W of about 3 inches and a depth D of about 3 inches. Of course, other sizes and configurations can be provided within the scope of the present description.

In an embodiment, the anti-vibration (vibration isolation) cushion 12 comprises cellulose fibers. The cellulose fibers may be recycled and heat/fire treated. In an embodiment, the cellulose fibers and may also be mixed with rubber and cellulose fibers or other absorbent materials. Of course, there are a number of vibration isolation materials which are suitable for cushion 12, for example: wood fiber panels (e.g. 10-20 lbs/pi3) composite wood panels (e.g. OSB, plywood), rubber, tissues, gypsum, wool, rock wool, glass wool, fiberglass, cellulose, cellulose fibers, leather, mineral wool, cardboard, bituminous or asphalt based, polyester and other tissue fibers, polyurethane (foam), Expanded Polystyrene, Polyisocyanurate, Extruded polystyrene, Cork, linoleum.

In an embodiment, the outer surface 16 of the anti-vibration cushion 12 includes dimples 18 which provides small air pockets for additional absorption.

In an embodiment, the absorbent cushion 14 comprises rubber. In an embodiment, the rubber is neoprene. In an embodiment, the neoprene has a durometric scale of about 20 to 60. Of course, there are a number of absorbent materials which are suitable for cushion 14, for example: acoustic foams, soundproofing foams, rubber cushion, tissue.

The device 10 includes opposite faces, 16 and 20. The first surface 16 is defined by the outer surface of the anti-vibration cushion 12. The opposite second surface 20 is defined by the outer surface of the absorbent 14. The terms "first" and "second" are used herein for indicative purposes only and thus interchangeable.

In the non-limiting example shown here, the second surface 20 comprises an adhesive such as a pressure-sensitive adhesive and is covered by a detachable adhesive film 22 which protects the adhesive on surface 20. The user removes the film 22 as shown in FIG. 2, in order to directly adhesively mount the outer surface 20 of the absorbent cushion 14 and thus the device 10 on a desirable structural surface as shown in FIGS. 6, 7, 8 and 9 for example with surface 16 being exposed.

Figure 3:
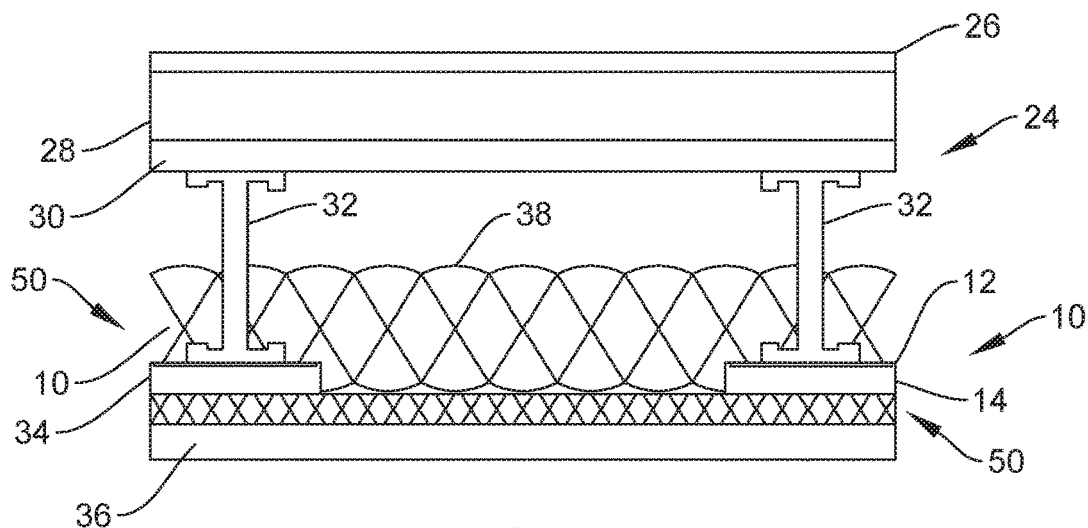
FIG. 3 is a front elevation view of an assembly of the vibration absorption device of FIG. 1 installed to the anchoring systems of a wood ceiling frame in accordance with a non-limiting illustrative embodiment of the present disclosure.
Figure 4:
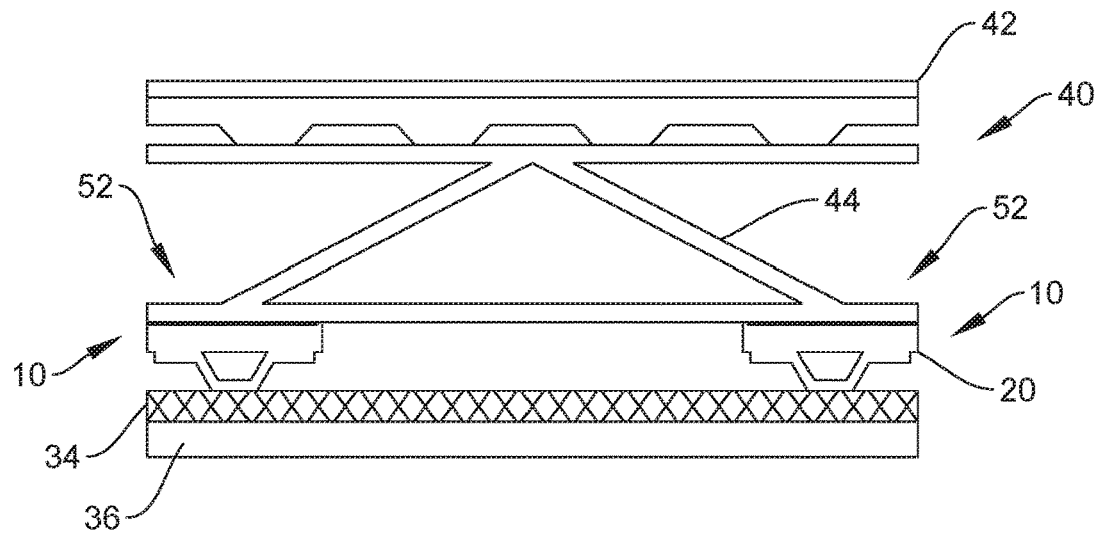
FIG. 4 is a front elevation view of an assembly of the vibration absorption device of FIG. 1 installed to the anchoring system of a metal (steep) ceiling frame in accordance with a non-limiting illustrative embodiment of the present disclosure.

Alternatively, surface 16 may include the adhesive and the detachable protective film 22 and thus the outer surface 16 of the anti-vibration cushion 12 and thus the device 10 is directly adhesively mounted to a desirable structural surface as shown in FIGS. 2, 3 and 4.

Moreover, both surfaces 16 and 20 include an adhesive substance as well as respective detachable protective films 22 to adhesively mount either surface 16 or 20, or both, to a desirable structural surface.

Thus, the device 10 is self-adhesive. As such, during construction, the user may simply position the device 10 at the appropriate areas and adhere it thereon by applying light pressure with their hands. This allows for a quicker and less costly assembly during building.

In an embodiment, the device 10 does not include an adhesive substance and may be mounted to a variety of structural surfaces by the addition of an adhesive substance, by fasteners, and other suitable connectors as can be contemplated by the skilled artisan.

Turning now to FIG. 3, there is shown an assembly of devices 10 mounted to a wood frame structure 24. In this example, the structure 24 includes a floor covering 26 (of the above floor) on a concrete slab 28 with a plywood panel 30 mounted to the upper concrete slab 28. Beams 32 hang from the plywood panel 30 at one end thereof and carry a device 10 at the other end thereof. The device 10 is sandwiched between the beams 32 and a gypsum panel 34 which overlies the next floor's ceiling cover 36. Insulating wool 38 is placed in the space above the gypsum panel 34.

FIG. 4 shows an example of an assembly of devices 10 mounted to a metal frame structure 40. In this example, the structure 40 includes a steel deck 42, with beams 44 dependently mounted thereto and carrying on their bottom ends devices 10. Resilient channel elements 46 are mounted to the devices 10 and engage a gypsum panel 34 overlying a ceiling covering 36.

Figure 5:
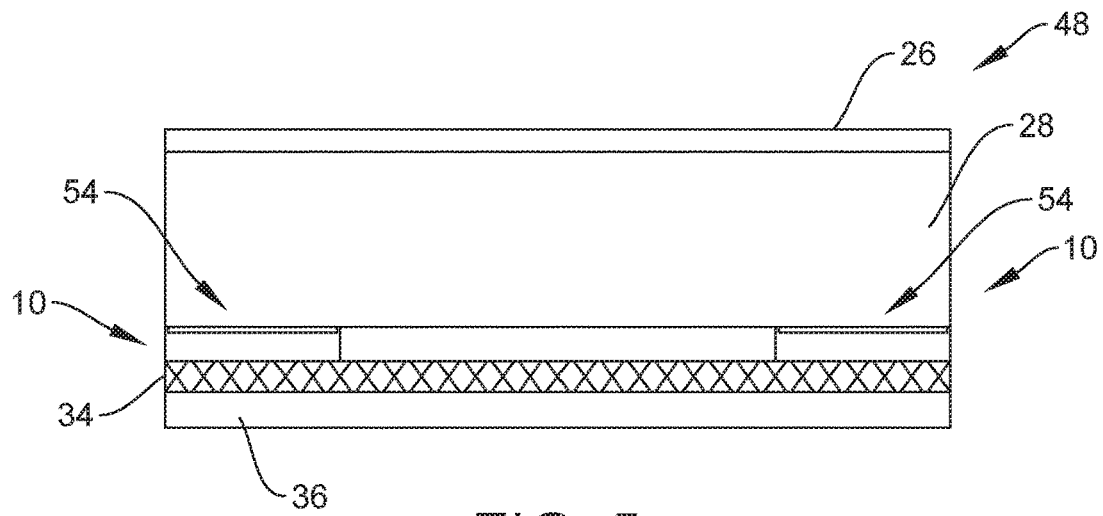
FIG. 5 is a front elevation view of an assembly of the vibration absorption device of FIG. 1 installed to the anchoring system of a concrete ceiling frame in accordance with a non-limiting illustrative embodiment of the present disclosure.

FIG. 5 shows an example of an assembly of devices 10 mounted to a concrete frame structure 48. In this example, the structure 48 includes a floor covering 26 overlying an overhead concrete slab 28. The devices 10 are mounted between the overhead slab 28 and the gypsum panel 34 overlying the ceiling covering.

FIGS. 3, 4 and 5 show that devices 10 are mountable to the anchoring points 50, 52 and 54 for the frame structures 24, 40, and 48 respectively.

Figure 6:
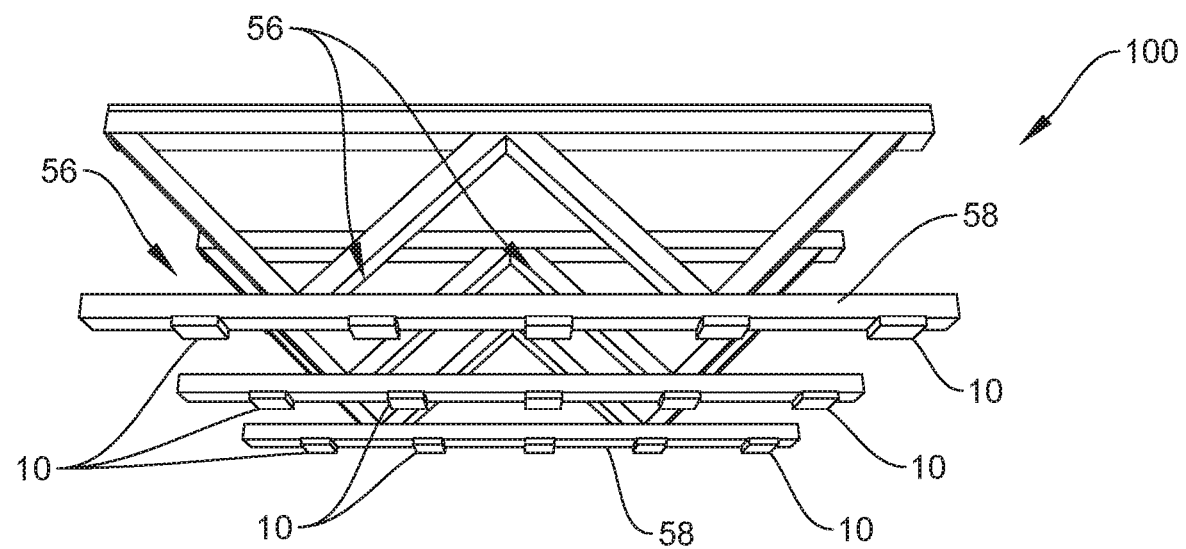
FIGS. 6, 7 and 8 are bottom, side perspective views of a wood ceiling frame structure comprising an assembly of vibration absorption devices of FIG. 1 in accordance with a non-limiting illustrative embodiment of the present disclosure.
Figure 7:
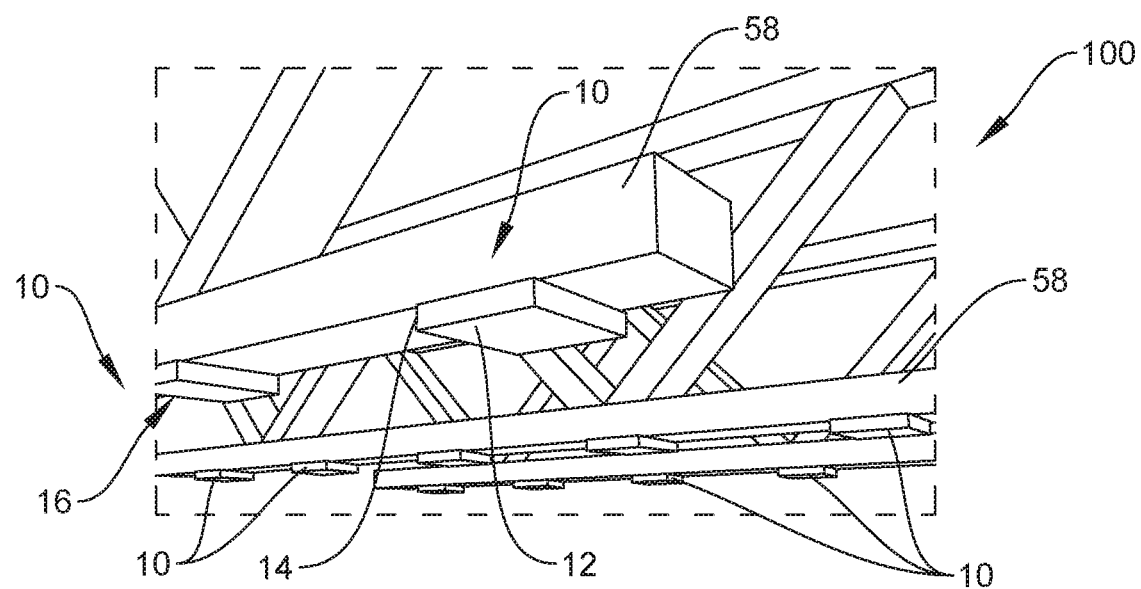
Figure 8:
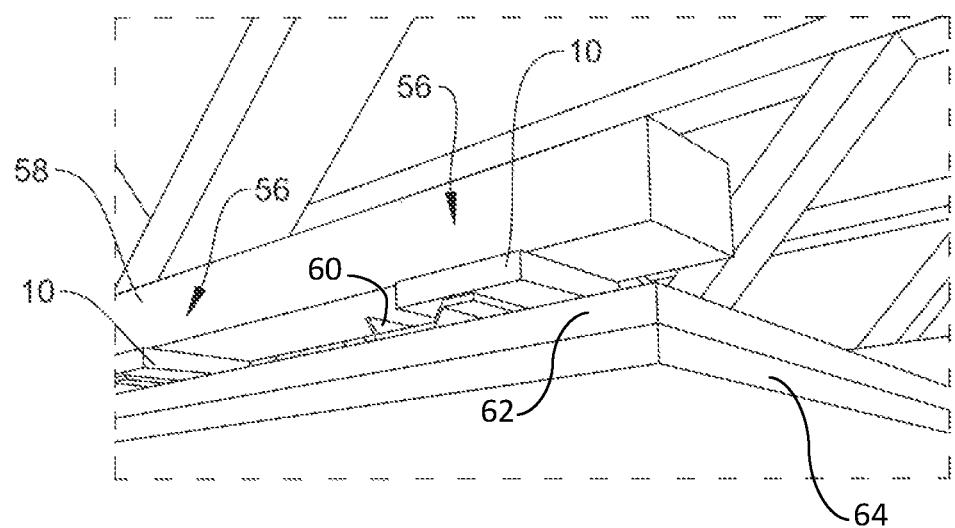

FIG. 6 shows an assembly 100 of devices 10 each being mounted to the anchoring points 56 of a ceiling beam structure 58. FIG. 7 is a close-up of a portion of FIG. 6 showing the devices 10 hanging from the beam structure 58. FIG. 8 is another close-up view similar to FIG. 7 showing the devices 10 mounted to a resilient channel member 60 which in turn is mounted to a gypsum panel 62 overlying a ceiling cover 64.

Figure 9:
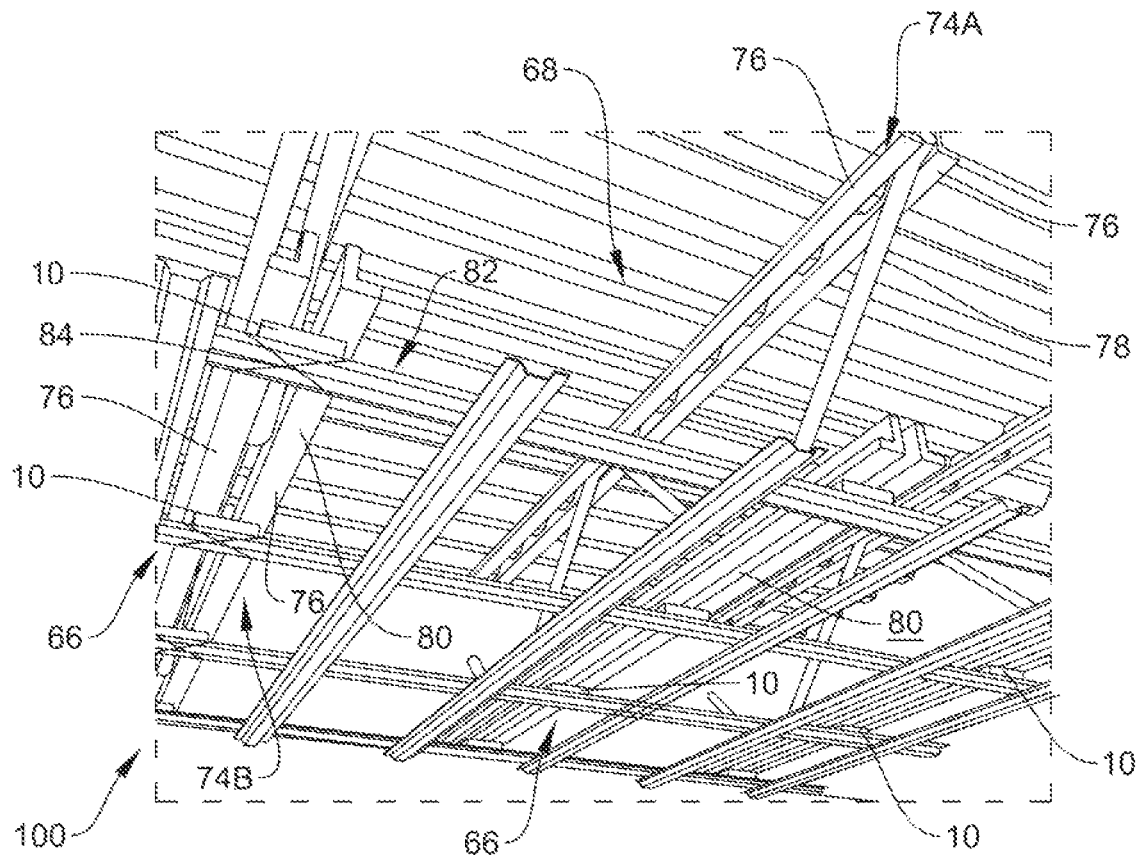
FIG. 9 is a bottom perspective views of a metal ceiling frame structure comprising an assembly of vibration absorption devices of FIG. 1 in accordance with a non-limiting illustrative embodiment of the present disclosure.

FIG. 9 shows an assembly 100 of devices 10 each being mounted to anchoring points 66 of a ceiling frame structure 68. The ceiling frame structure 68 comprises an top overhead panel 70 with a beam assembly 72 connected thereto, the beam assembly 72 includes a similar top and bottom T-shaped channel elements 74A and 74B, formed of two spaced apart longitudinal members 76 that define a receiving channel for the opposite ends of a diagonally positioned rods 78. The devices 10 are mounted to the bottom surfaces 80 of the bottom T-shaped channel elements and a resilient channel member 82 is secured to the devices 10 via lace elements 84.

Figure 10:
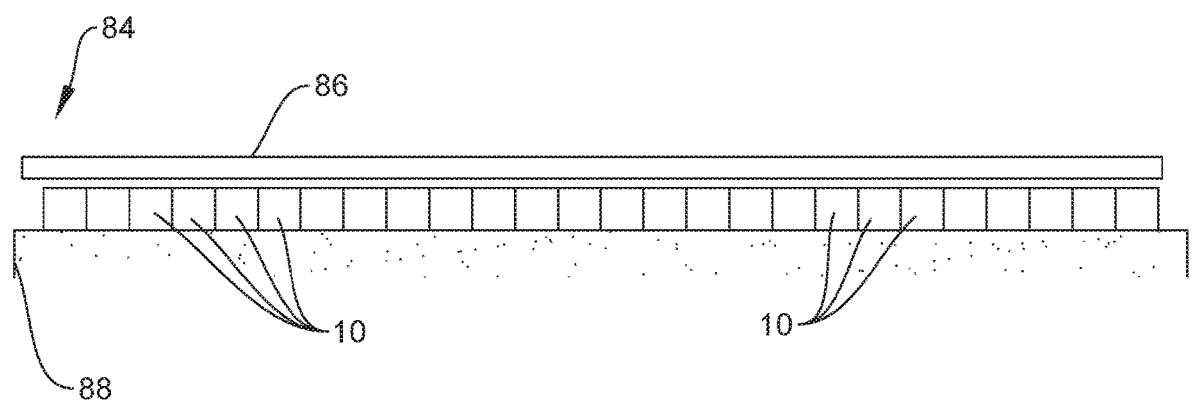
FIG. 10 is a schematic representation of a floor structure comprising an assembly of vibration absorption devices of FIG. 1 in accordance with a non-limiting illustrative embodiment of the present disclosure.

FIG. 10 shows a floor arrangement 84 having a floor covering 86 being spaced apart from the underlying concrete slab 88 separating the next floor level. An assembly of devices is positioned between the floor covering 86 and the slab 88.

Figure 11:
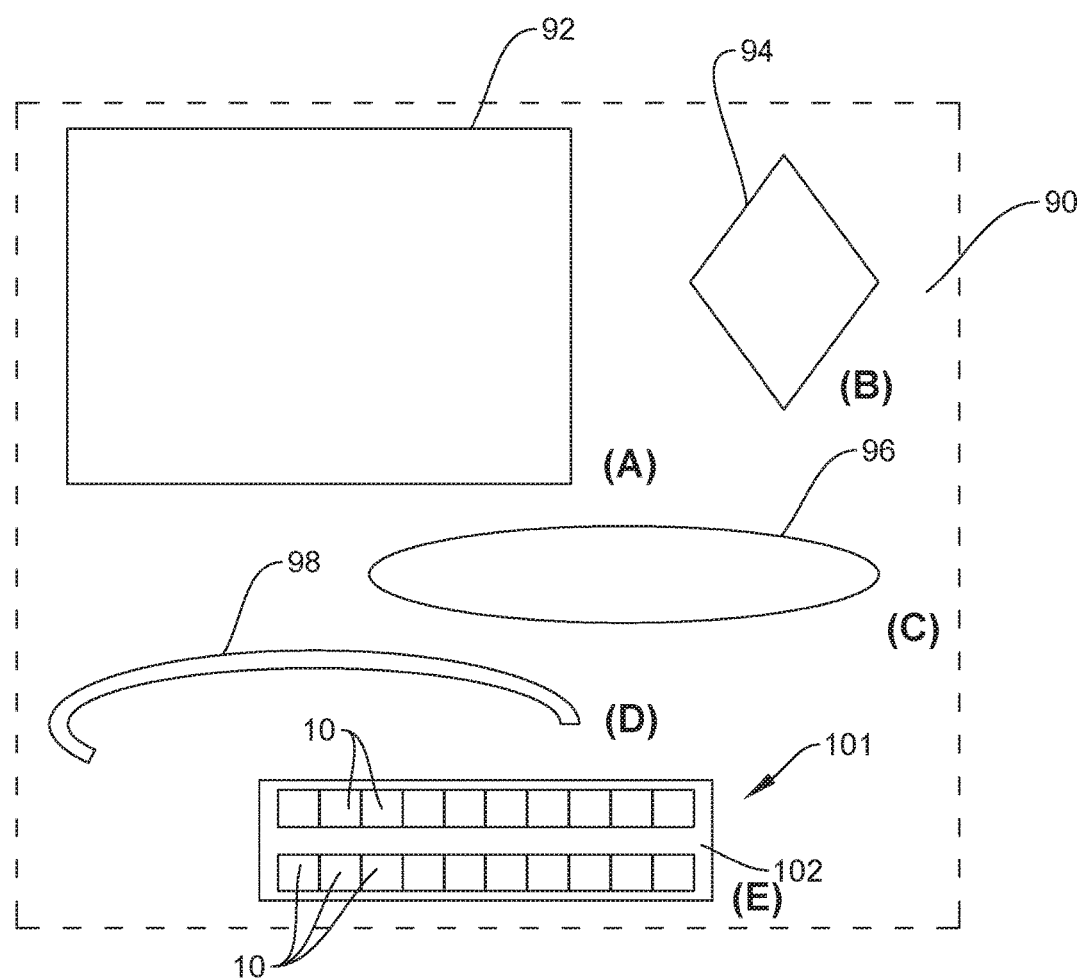
FIG. 11 is a front elevation view of a partition wall surface including a plurality of various vibration absorption devices (A), (B), (C), (D), (E) in accordance with various non-limiting illustrative embodiments of the present disclosure mounted thereon.
Figure 12A:
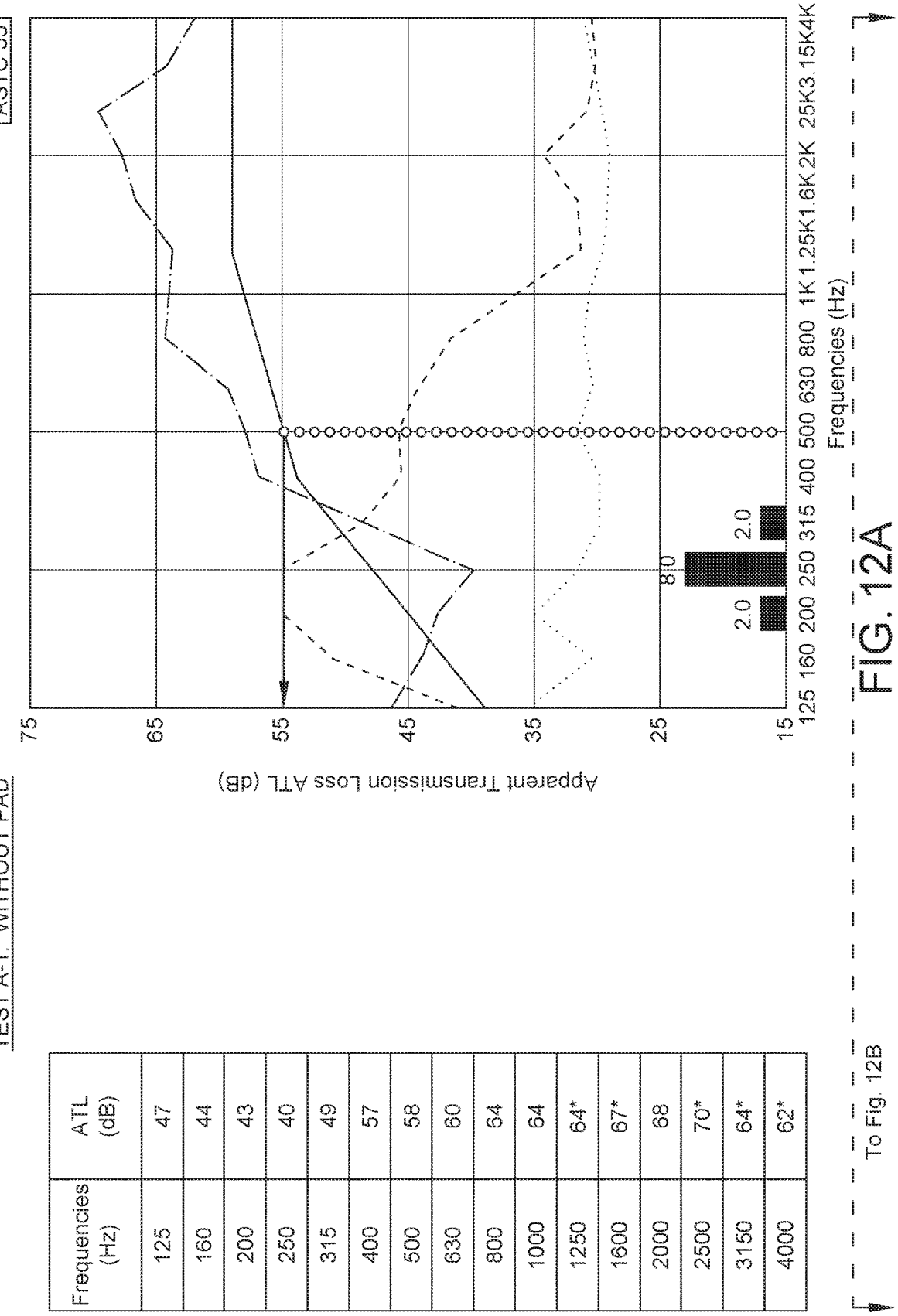
Figure 13A:
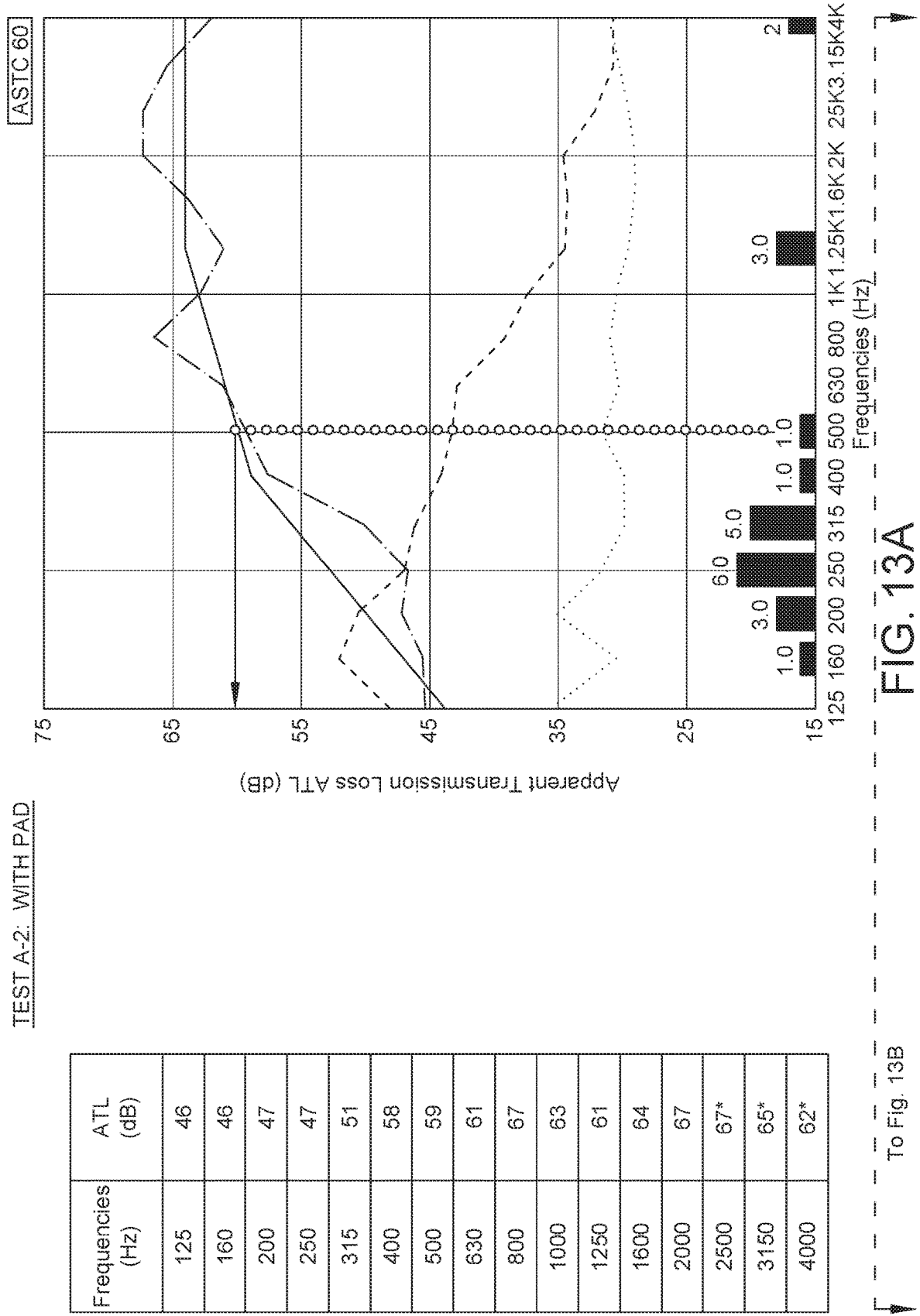
Figure 14A:
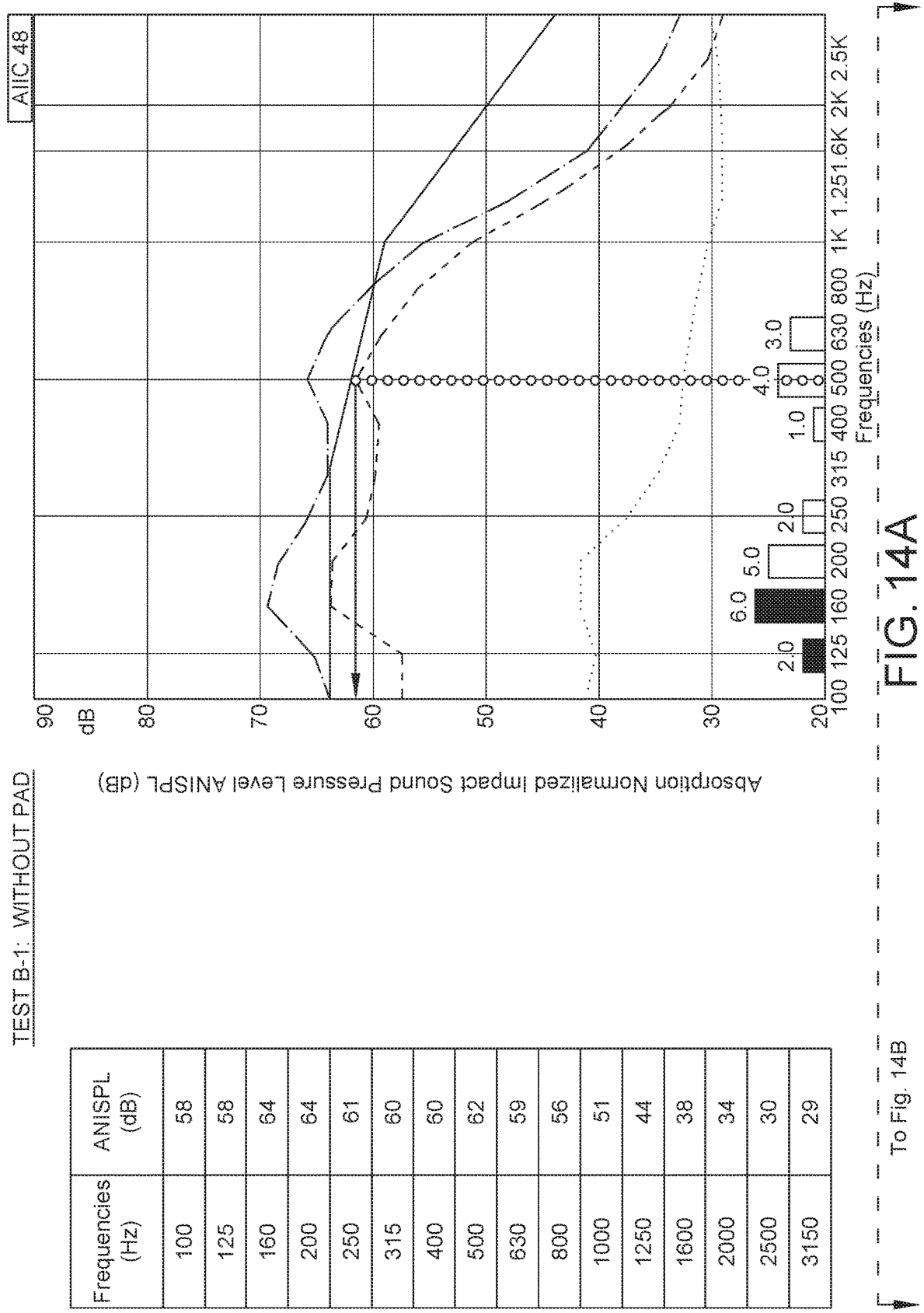
Figure 15A:
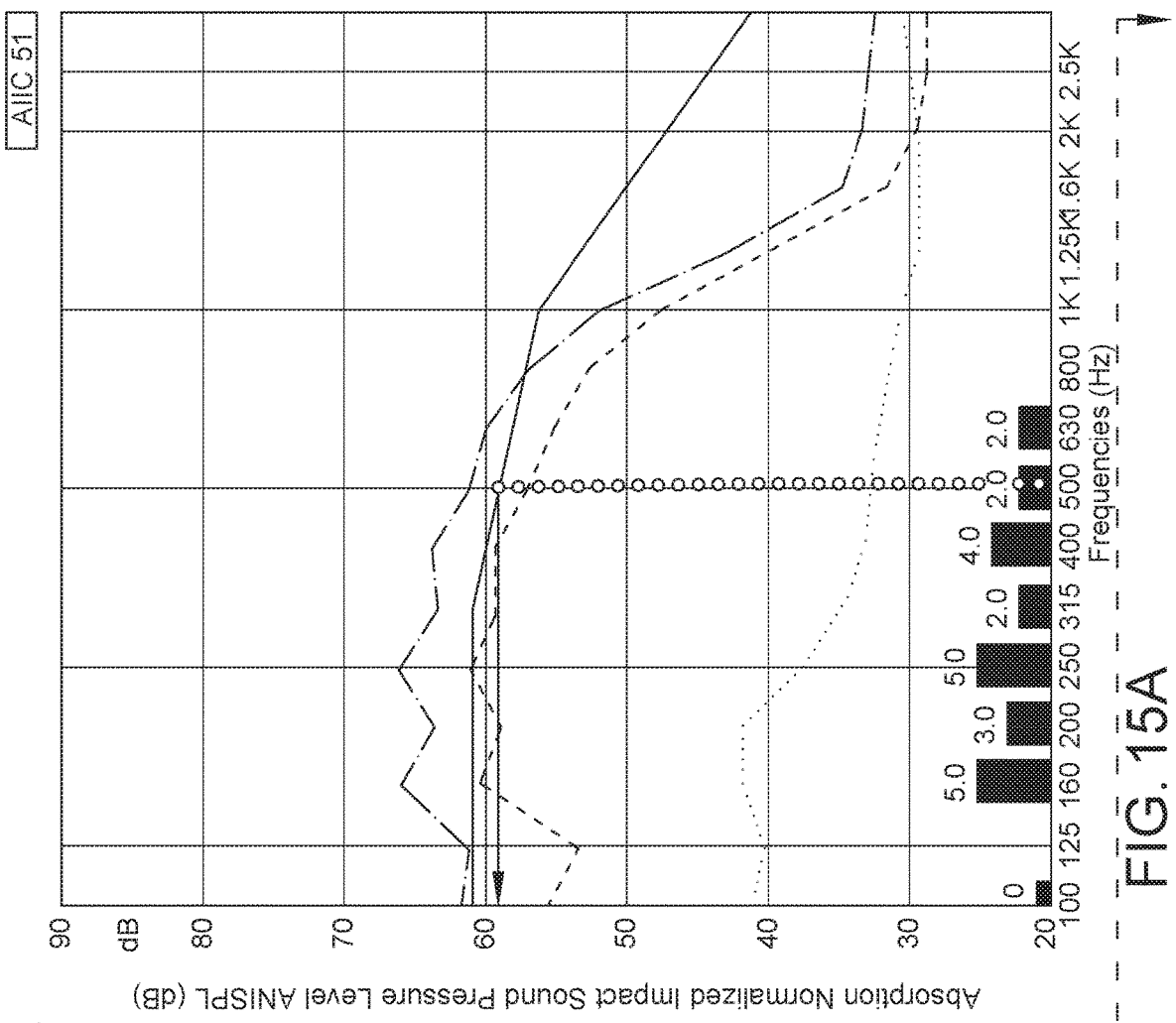

FIG. 11 shows various vibration absorption devices and assemblies for acoustic insulation mounted to a partition wall 90, namely devices 92 (A), 94 (B), 96 (C), 98 (D) and assembly 101 (E).

Device 92 is similar to device 10 but is a large rectangular panel that can be mounted to walls for soundproofing such as a music studio. Thus, a plurality of devices 92 form a modular assembly for soundproofing a room. Devices 94 and 96 are similar to device 92 but show other convenient configurations in order to further exemplify the vibration absorption devices provided herein.

Device 98 is a belt element that can be made of a more supple and narrower absorbent cushion with thinner side by side streaks of the anti-vibration cushion overlying the absorbent cushion. In this way, device 98 is malleable along its longitudinal length in order to shape it to a desired form on a surface.

In another embodiment, the devices 10 can include mutual connecting elements to be connected together along various trajectories on a surface.

Assembly 101 shows a sheet 102 with a plurality of devices 10 mounted thereto. The sheet 102 is mountable to a surface via an adhesive substance or fasteners. In an embodiment, the sheet 102 comprises a first surface 104 with the devices 10 mounted thereto and an opposite surface including an adhesive substance protected by a detachable protective film as previously discussed.

The following are non-limiting examples of characteristics of the device 10 in accordance with a non-limiting illustrative embodiment thereof:

TABLE I

| Characteristic | Results | Standard |
| --- | --- | --- |
| Density | 14.5 lbs./ft$^3$ 232 kg/m$^3$ | ASTM D-1037 |
| Transverse load at rupture | 9.0 lbs 40 N | ASTM C-209 |
| Tensile strength perpendicular to surface | 761 lbs./ft$^2$ (min) 36.5 kPa (min) | ASTM C-165 |
| Tensile strength parallel to surface | 187 lbs./in$^2$ (min) | ASTM C-209 |
| Water absorption | 6% | ASTM C-209 |
| Linear expansion | 0.10% | ASTM D-1037 |
| Comprehensive strength (10% deformation) | 34.8 lbs./in$^2$ (min) 23.54 kg/cm$^2$ (min) | ASTM C-165 |
| Compressive strength (25% deformation) | 51 lbs./in$^2$ (min) 3.59 kg/cm$^2$ (min) | ASTM C-165 |
| Tensile and Tensile Adhesion Properties | 31.5 kPa | ASTM D-1623-09 |

In an embodiment, the device 10 provides for increasing sound attenuation (i.e. soundproofing) by 3 to 5 dB. In an embodiment, the device 10 has a stable (R-value of R=3.1/inch). In an embodiment, the device 10 is classified UL 790, Class A. In an embodiment, the device 10 meets the physical requirements of CAN/US-S-706, ASTM C-208 standards. In an embodiment, the device 10 meets the stringent fire resistance requirements of the ANSI/UL790 and CAN/ULC-S 107 standards and is certified Class A under the foregoing standards. The device 10 also complied with the requirements for class 1-90 and 1-540 standards for Factory Mutual (FM) approved systems.

Turning now to FIGS. 12A to 15B, various tests regarding the device 10 will now be discussed.

The tests herein are based on the following standards and instrumentations that are well known in the art:

Standards and Instrumentation

Standards relative to measurement methods: ASTM E-336-14: Measurement of Airborne Sound Attenuation between Rooms in Buildings. ASTM E-413-10: Classification for Rating Sound Insulation STC. ASTM E-1007-14: Field measurement of Tapping Machine Impact Sound Transmission Through Floor-Ceiling Assemblies. ASTM E-989-06: Classification for Determination of Impact Insulation Class IIC. ISO 3382: 1997: Measurement of the duration of reverberation in auditoriums.

Standards relative to instrumentation: CEI 225 (1966): Octave-band, half-octave and third-octave band filters destined to noises and vibrations.

Instrumentation Used

Larson Davis sound meter Model 831 (ANSI Class 1 approved). Larson Davis preamplifier Model PRM831 (ANSI Class 1 approved). Larson Davis microphone Model 377602 (ANSI Class 1 approved). Larson Davis calibrator Model CAL200 (AINSI Class 1 approved). Bruel & Kiaer sound source Model 4224. Bruel & Kiaer tapping machine Model 3204. Larson Davis acoustic software Model D.N.A.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A vibration absorption assembly for acoustic insulation for a building ceiling structure comprising an overhead structure, a ceiling beam and joist structure mounted to and positioned beneath the overhead structure, a plurality of longitudinal resilient channel members mounted to and positioned beneath the ceiling beam and joist structure to define spaced apart anchoring points, and a gypsum panel mounted to and positioned beneath the plurality of longitudinal resilient channel members and providing a ceiling, the ceiling structure separating an upper floor and a lower floor, the vibration absorption assembly comprising a plurality of generally rectangular non-metallic self adhesive and removable pads, each one of the pads providing for being mounted between the ceiling beam and joist structure and the plurality of longitudinal resilient channel members at the respective ones of the anchoring points, each one of the pads has a thickness of about ½ an inch, a width of about 3 inches and a depth of about 3 inches, each one of the pads comprises:
   an absorbent cushion comprising sound absorbing foam material; and
   a vibration isolation cushion comprising vibration isolation material comprising fire rated fiberboard, the vibration isolation cushion completely overlying and being laminated to the absorbent cushion thereby being devoid of any space between absorbent cushion and the vibration isolation cushion, the absorbent cushion and the vibration isolation cushion comprising respective exposed surfaces, the vibration isolation cushion being rigid relative to the absorbent cushion and the absorbent cushion being supple relative to the vibration isolation cushion, the absorbent cushion comprising a material density of about 5 lb/ft3 to about 185 lb/ft3, the vibration isolation cushion comprising a material density of about 0.01 lb/ft3 to about 10 lb/ft3, the absorbent cushion having a thickness that is greater than the thickness of the vibration isolation cushion,
   wherein the exposed surface of the vibration isolation cushion comprises a structure engaging surface and comprises dimples for providing air pockets for additional absorption, wherein each of the dimples comprises an oval depression formed within the structure engaging surface defining an opening and having a rim formed in the structure engaging surface circumscribing the opening;
   wherein each one of the pads comprises: a transverse rupture load strength of 9.0 lbs.; a minimal tensile strength perpendicular to the surface of 761 lbs./ft$^2$; a minimal tensile strength parallel to surface of 187 lbs./in$^2$; a water absorption of 6%; a linear expansion of 0.10%; a minimal comprehensive strength at 10% deformation of 34.8 lbs./in$^2$; a minimal comprehensive strength at 25% deformation of 51 lbs./in$^2$; and tensile adhesion properties of 31.5 kPa;

wherein the structure engaging surface is directly and flushingly mountable to the respective one of the anchoring points, wherein the plurality of pads provide for isolating vibrations and acoustic insulation between the two separated and adjacent building compartments or between the building compartment and the external environment, wherein the assembly comprises an Apparent Sound Transmission Class (ASTC) index of at least 60 and an Apparent Impact Insulation Class (AIIC) index of at least 51, wherein when the vibration absorption assembly is mounted to the ceiling structure and positioned between the ceiling beam and joist structure and the plurality of longitudinal resilient channel members at the respective ones of the anchoring points it provides for increasing sound attenuation by about 3 to 5 decibels between the upper and lower floors.

2. A vibration absorption assembly according to claim 1, wherein the exposed surface comprises an adhesive substance.

3. A vibration absorption assembly according to claim 2, further comprising a detachable protective film covering the exposed surface comprising the adhesive substance.

4. A vibration absorption assembly according to claim 1, wherein the sound absorbing material comprises rubber.

5. A vibration absorption assembly according to claim 4, wherein the rubber comprises neoprene.

6. A vibration absorption according to claim 1, wherein the vibration isolation material further comprises material selected from the group consisting of cellulose fibers, heat/fire treated cellulose fibers, cellulose fibers mixed with rubber, wood fiber panels, composite panels, gypsum, tissues and any combination thereof.

7. A vibration absorption assembly according to claim 1, wherein the absorbent cushion comprises about 75% of the total thickness of the device.

8. A vibration absorption device according to claim 1, further comprising connecting elements for connecting the device to another vibration absorption device for acoustic insulation.

9. A vibration absorption assembly for acoustic insulation for a building structure separating two adjacent building compartments or a building compartment and the external environment, the building structure being selected from the group consisting of a ceiling structure, a floor structure and a partitioning structure, the assembly comprising: a plurality of the devices of claim 1.

10. A vibration absorption assembly according to claim 9, wherein each of the devices comprises connecting elements for mutually connecting two adjacently positioned devices together.

11. A vibration absorption assembly according to claim 9, wherein the devices are mounted to a sheet, the sheet being mountable to the building structure.

12. A vibration absorption assembly according to claim 11, wherein the sheet comprises an adhesive substance.

13. A vibration absorption assembly according to claim 12, wherein the adhesive substance is covered by a detachable protective film.

* * * * *